March 8, 1966 W. J. GRIEME 3,238,923
ANIMAL OILER AND SCRATCHER
Filed Jan. 20, 1964
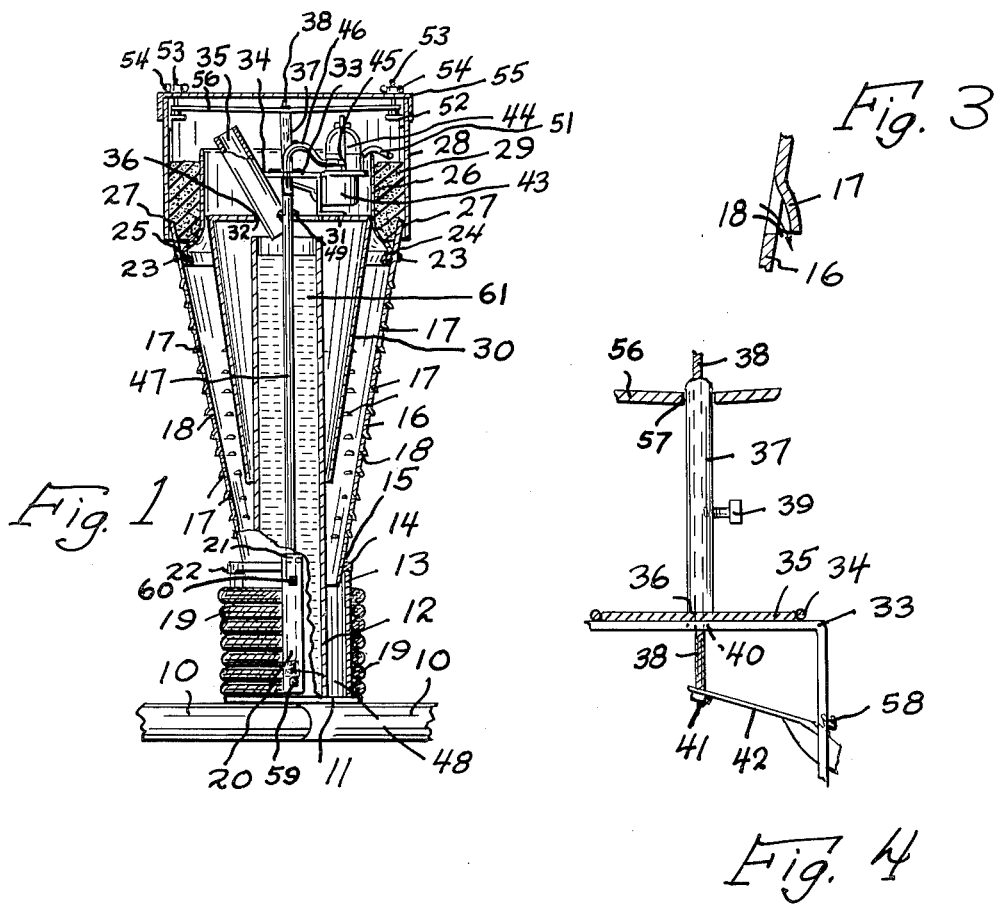
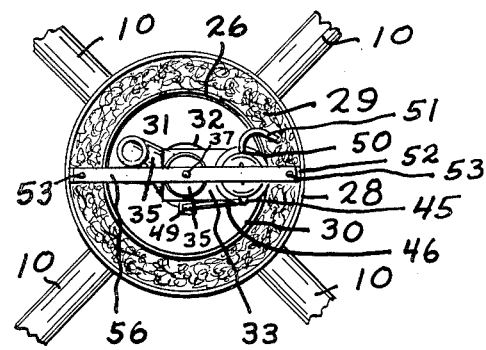
INVENTOR.
Werner J. Grieme
BY
Sam J. Slotky
ATTORNEY

United States Patent Office 3,238,923
Patented Mar. 8, 1966

3,238,923
ANIMAL OILER AND SCRATCHER
Werner J. Grieme, Schaller, Iowa
Filed Jan. 20, 1964, Ser. No. 338,657
1 Claim. (Cl. 119—157)

My invention relates to an animal oiler and scratcher.

An object of my invention is to provide an animal oiler and scratcher which will serve to cause insecticide etc. to penetrate into the hide of the animal to thereby provide the resultant advantages thereto.

A further object of my invention is to provide an arrangement which due to its conical shape will insure that when the animal rubs against the device, the penetration of the oil will be maximum, and which device includes the necessary scratching or rubbing features.

A further object of my invention is to provide a device which will automatically maintain the necessary oil in the proper location at all times, and wherein the oil is uniformly fed through the sides of the conical member.

A further object of my invention is to provide a simplified arrangement which can be supplied as a compact unit without requiring posts and the like.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

FIGURE 1 is a partially sectional view with fragmentary sections of the device,

FIGURE 2 is a plan view of FIGURE 1 with the lid removed,

FIGURE 3 is a detail, and

FIGURE 4 is a further enlarged detail.

My invention relates to an animal oiler and scratcher which includes a variety of features as above mentioned in the objects of my invention.

I have used the character 10 to designate transversely positioned pipes suitably bolted to a lower plate 11, and welded to the plate 11 is a vertically positioned pipe or tube 12.

Spaced from the pipe 12 is an outer larger diameter pipe or tube 13 attached to a flange 14. The flange 14 is welded at 15 to an outer conical member 16, the member 16 having the many punched out portions 17, thereby leaving the openings 18 (see FIGURE 3).

Wound about the outer pipe 13 is a helical rope 19 which is locked in place by means of the strap 20, the strap 20 having the inwardly bent flange 21 which is positioned above the flange 14 a slight distance to allow rocking action of the conical member 16.

The character 22 indicates a lug attached to the conical member 16 which is received within a suitable slot in the flange 14.

Securely attached within the cone 16 by means of the machine screws 23 is an annular angle flange 24 which tightly receives at 25 a rubberized or other fabric member 26 which is substantially cylindrical in shape as shown, and welded at 27 to the upper edge of the cone 16 is a vertically positioned cylindrical casing member 28, and received between the member 28 and the member 26 is a suitably absorbent plastic or other type sponge member 29 which is merely wrapped within this space as shown, and which can be supplied as a lengthened piece of the material which is then placed in the circular form.

The character 30 indicates a further conical member which is spaced from the conical member 16, the member 30 having a top wall 31 which includes a central opening 32.

Attached to the wall 31 is an angle support 33 to which is welded at 34 an angularly positioned tube 35 which is welded at 36 within the opening 32. Attached to the support 33 (see FIGURE 4) is a ring 34, and received within the ring 34 is a flat disc 35 which is attached at 36 to a vertically positioned tube 37, and received within the tube 37 is a flexible cable 38 which is secured firmly by means of the screw 39. The cable 38 passes through an opening 40 in the support 33, and is secured at 41 to a lever 42 which is suitably pivoted within the casing 43 of a pump member 44 (see FIGURE 1), the pump member 44 being of a conventional type which is operated by the lever 42 and which includes a certain diaphragm arrangement which draws in liquid and pumps out the same.

Attached at 45 to the pump member 44 is a flexible tube 46 which communicates with the lengthened vertical tube 47 which terminates in a strainer 48, the tube 47 being supported at 49.

Attached at 50 to the pump member 44 is a further flexible tube 51 which communicates to the sponge member 29. Attached within the member 28 are the ears 52 and attached to the ears 52 are the vertical studs 53 engaged by the wing-nuts 54 which are attached to secure the lid 55.

Secured to the studs 53 is a strap 56 including a central opening 57 (see FIGURE 4) which receives the top of the tube 37. The character 58 indicates a spring adapted to spring-urge the lever member 42.

The character 59 indicates a bolt passing through the strap 20 to allow pivoting of the strap 20 whereby the strap can be placed in the position shown in FIGURE 1 to retain the cone member 16 etc. and to also retain the coiled rope 19, a further bolt 60 serving to lock the strap 20 in this position, the bolts 59 and 60 being attached to the member 13.

The device operates in the following manner.

As the hog or pig rubs against the cone 16 and portions 17 to obtain the desired scratching effect or sensation, each movement of the animal against the cone 16 will correspondingly rock the tube 37 since the upper end of this tube is received within the opening 57 of the strap 56 which is secured to the studs 53. This rocking action causes a leverage to be applied against the periphery of the disc 35 which effectively causes the cable 38 to pivot the lever 42, whereby the pump 44 will draw the fluid such as the insecticide etc. 61 upwardly through the tube 47, the action in the pump then forcing this insecticide out through the tube 51 and into the sponge material 29.

The excess liquid rising above the sponge material 29 will flow downwardly along the inside of the member 26 and along the cone 16 and out through the openings 18 on to the animal's hide.

The continual action of the movement of the creature against the cone will therefore constantly maintain the insecticide liquid in the sponge material and above the same so that there will always be sufficient liquid to flow downwardly on to the animal's hide, the sponge acting as a reservoir, and including the other apparent advantages of retention of the liquid etc.

The lid 55 can be removed whenever desired and more liquid poured into the tube 12 through the pipe 35.

The coiled rope 19 will serve as a rubbing medium for the small pigs, since the rope 19 will constantly absorb excess fluid.

It will now be noted that I have provided the advantages mentioned in the objects of my invention with further advantages being apparent.

Some changes may be made in the construction and arrangement of the parts of my invention without departing from the real spirit and purpose of my invention, and it is my invention to cover by my claim any modified forms of structure or use of mechanical equivalents which may be reasonably included within its scope.

I claim as my invention:

An animal oiler and scratcher comprising a substantially conical outer shell, said outer shell having a plurality of punched out scratching portions providing openings, a centrally positioned liquid receiving reservoir, a sponge-like annular member positioned above and in oil conveying contact with said substantially conical outer shell, means for pumping said liquid to said sponge-like member, said pumping means including further means for drawing liquid from said reservoir, said pumping means including a pump unit, means for operating said pump unit including a tube-like post, a strap receiving said post, said strap being attached to said substantially conical member, whereby movement of said substantially conical member caused by movement of an animal bearing thereagainst will cause said post to rock, means attached between said post and said pump unit to operate said pump unit, an inner substantially conical member spaced from said conical member, said inner conical member having an upper opening, a filler pipe attached to said opening for filling said reservoir, a lower cylindrical member upon which said conical member rests, a coiled rope wrapped about said lower cylindrical member.

References Cited by the Examiner

UNITED STATES PATENTS

| | | | |
|---|---|---|---|
| 1,201,351 | 10/1916 | Rule | 119—157 |
| 1,315,583 | 9/1919 | Starbuck | 119—157 |
| 1,636,624 | 7/1927 | Clements | 119—157 |
| 2,438,731 | 3/1948 | Wedeking | 119—157 |
| 2,702,020 | 2/1955 | Worden | 119—157 |
| 2,706,465 | 4/1955 | Caldwell | 119—157 |
| 2,768,608 | 10/1956 | Anderson | 119—157 |
| 3,156,216 | 11/1964 | Poage | 119—157 |

SAMUEL KOREN, *Primary Examiner.*

ALDRICH F. MEDBERY, *Examiner.*